United States Patent
Pyun et al.

(10) Patent No.: US 12,286,507 B2
(45) Date of Patent: Apr. 29, 2025

(54) FLAME RETARDANT PRESSURE-SENSITIVE ADHESIVE AND METHOD OF MAKING

(71) Applicant: 3M INNOVATIVE PROPERTIES COMPANY, St. Paul, MN (US)

(72) Inventors: Eumi Pyun, St. Paul, MN (US); Hei-Seung Harry Lee, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/698,249

(22) PCT Filed: Oct. 12, 2022

(86) PCT No.: PCT/IB2022/059781
§ 371 (c)(1),
(2) Date: Apr. 3, 2024

(87) PCT Pub. No.: WO2023/073470
PCT Pub. Date: May 4, 2023

(65) Prior Publication Data
US 2024/0425622 A1  Dec. 26, 2024

Related U.S. Application Data

(60) Provisional application No. 63/263,041, filed on Oct. 26, 2021.

(51) Int. Cl.
C09J 7/25 (2018.01)
C08F 8/40 (2006.01)
C09J 7/38 (2018.01)

(52) U.S. Cl.
CPC ........ *C08F 8/40* (2013.01); *C09J 7/25* (2018.01); *C09J 7/385* (2018.01); *C08F 2810/50* (2013.01); *C09J 2301/302* (2020.08); *C09J 2301/414* (2020.08); *Y10T 428/2891* (2015.01)

(58) Field of Classification Search
None
See application file for complete search history.

(56) References Cited

U.S. PATENT DOCUMENTS

| | | | |
|---|---|---|---|
| 9,926,473 B2 | 3/2018 | Ross et al. | |
| 10,526,515 B2 | 1/2020 | Pyun et al. | |
| 2002/0032279 A1 * | 3/2002 | Hwang | C08F 8/40 525/107 |
| 2004/0026671 A1 | 2/2004 | Van den Bergen et al. | |
| 2018/0022967 A1 * | 1/2018 | Pyun | C09K 21/14 428/355 AC |

FOREIGN PATENT DOCUMENTS

| | | | |
|---|---|---|---|
| CN | 104497225 A | | 4/2015 |
| CN | 109897149 A | | 6/2019 |
| JP | H07157741 A | | 6/1995 |
| JP | 2011116831 A | * | 6/2011 |
| WO | 2015148314 A1 | | 10/2015 |
| WO | 2016109261 A1 | | 7/2016 |
| WO | 2016109262 A1 | | 7/2016 |
| WO | 2019239291 A1 | | 12/2019 |
| WO | 2020015289 A1 | | 1/2020 |

OTHER PUBLICATIONS

Yamaguchi et al., "Pressure-Sensitive Adhesive Composition, Pressure-Sensitive Adhesive Layer And Pressure-Sensitive Adhesive Laminated Product", machine translation of JP2011116831 A, Jun. 16, 2011 (Year: 2011).*
International Search Report for PCT International Application No. PCT/IB2022/059781, mailed on Feb. 14, 2023, 4 pages.
Mattioni, "Prediction of Glass Transition Temperatures from Monomer and Repeat Unit Structure Using Computational Neural Networks", Journal of Chemical Information and Computer Sciences, Mar. 2002, vol. 42, No. 2, pp. 232-240.
Satas, "Handbook of Pressure Sensitive Adhesive Technology", 1989, p. 172.
Zhu, "Flame retardance of UV cured epoxy acrylate blended with different states of phosphated methacrylate", Polymer Degradation and Stability, 2003, No. 82, No. 3, pp. 435-439.
Zhu, Synthesis, characterization and flame retardancy of methacrylated phosphate/diphosphate, Polymer International, Jan. 2004, vol. 53, No. 3, pp. 266-271.
Zhu, "Thermal degradation of a new flame retardant phosphate methacrylate polymer", Polymer Degradation and Stability, 2003, vol. 80, No. 2, pp. 217-222.

* cited by examiner

*Primary Examiner* — Anish P Desai

(57) ABSTRACT

A method of making a (meth)acrylate copolymer having pendent phosphate-containing groups and a pressure-sensitive adhesive that contains the (meth)acrylate copolymer having pendent phosphate-containing groups are provided. The method includes reacting a precursor (meth)acrylate copolymer having pendent carboxylic acid groups with an epoxy-functionalized phosphate compound. The pendent phosphate-containing groups on the reaction product can function as a flame retardant for the pressure-sensitive adhesive.

11 Claims, No Drawings

FLAME RETARDANT PRESSURE-SENSITIVE ADHESIVE AND METHOD OF MAKING

CROSS REFERENCE TO RELATED APPLICATIONS

This application is a national stage filing under 35 U.S.C. 371 of PCT/IB2022/059781, filed Oct. 12, 2022, which claims the benefit of Provisional Application No. 63/263,041, filed Oct. 26, 2021, the disclosure of which is incorporated by reference in its/their entirety herein.

BACKGROUND

Polymeric materials such as pressure-sensitive adhesives are used in a variety of applications where fire risk is a concern, such as in aircraft, automobiles, trains, ships, building construction, and in conjunction with electronics and electrical wiring. Since many polymeric materials are flammable, a variety of flame retardants are added to minimize the fire risk associated with their use. Flame retardants reduce the flammability of various materials by a variety of mechanisms such as quenching free radicals in the gas phase, reacting with chemical fragments from the burning material to initiate char formation, or forming barrier layers within the burning material.

Commonly used flame retardants include halogenated compounds such as polyhalogenated diphenyl ethers. These flame retardants are well-known and can be efficient at fire retardation in combustible materials. However, many compounds in this class of flame retardants are considered hazardous substances. Several of the most effective halogenated flame retardants have been banned by the European Union under the Restriction of Hazardous Substances (RoHS) since Jul. 1, 2006. Other countries and individual states of the United States are also following with similar RoHS directives.

Phosphorus-based compounds are a leading class of non-halogenated flame retardants that have been used to replace halogenated flame retardants in many applications. Ammonium polyphosphates (APP) are among the most effective non-halogenated flame retardants; however, they have limited compatibility with polymeric materials such as pressure-sensitive adhesives. For example, to function effectively as a flame retardant, the amount that is added often tends to lead to poor adhesion, reduced shear holding power, and poor processability.

Metal hydroxides, zinc borates, and melamine particles are also effective non-halogenated flame retardants but must be added at high loading levels to pass standard flammability tests, which can lead to poor adhesion and poor mechanical properties.

SUMMARY

A method of making a (meth)acrylate copolymer having pendent phosphate-containing groups and a pressure-sensitive adhesive that contains the (meth)acrylate copolymer having pendent phosphate-containing groups are provided. The pendent phosphate-containing groups can function as a flame retardant.

In a first aspect, a method of making a (meth)acrylate copolymer having a pendent phosphate-containing group is provided. The method includes providing a precursor (meth) acrylate copolymer comprising a pendent carboxylic acid group and forming a reaction mixture comprising the precursor (meth)acrylate copolymer and an epoxy-functionalized phosphate compound. The method further includes reacting the epoxy group of the epoxy-functionalized phosphate compound with the pendent carboxylic acid group of the precursor (meth)acrylate copolymer to form the (meth) acrylate copolymer having the pendent phosphate-containing group.

In a second aspect, a pressure-sensitive adhesive is provided that is prepared according to the method described in the first aspect above.

In a third aspect, an article is provided that includes (a) a permanent or temporary substrate and (b) the pressure-sensitive adhesive described in the second aspect above positioned adjacent to the permanent or temporary substrate.

According to the Pressure-Sensitive Tape Council, pressure-sensitive adhesives (PSAs) are defined to possess the following properties: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Materials that are merely sticky or adhere to a surface do not constitute a PSA: the term PSA encompasses materials with additional viscoelastic properties.

PSAs are adhesives that satisfy the Dahlquist criterion for tackiness at room temperature and typically exhibit adhesion, cohesion, compliance, and elasticity at room temperature. This criterion defines a pressure-sensitive adhesive as an adhesive having a 1 second creep compliance of greater than $1 \times 10^{-6}$ cm$^2$/dyne as described in *Handbook of Pressure Sensitive Adhesive Technology*, Donatas Satas (Ed.), 2$^{nd}$ Edition, p. 172, Van Nostrand Reinhold, New York, NY, 1989. Alternatively, since modulus is, to a first approximation, the inverse of creep compliance, pressure sensitive adhesives may be defined as adhesives having a Young's modulus of less than $1 \times 10^6$ dynes/cm$^2$.

In this application, terms such as "a," "an," and "the" are not intended to refer to only a singular entity but include the general class of which a specific example may be used for illustration.

The term "and/or" means one or both. For example, the expression A and/or B means A alone, B alone, or both A and B.

The terms "polymer" and "polymeric material" are used interchangeably and can refer to a homopolymer, copolymer, terpolymer, and the like. The term "copolymer" is used to refer to a polymer having at least two different types of monomeric units.

As used herein, the term "monomer" refers to polymerizable compound having an ethylenically unsaturated group such as a (meth)acryloyl group or a vinyl group.

The term "monomeric unit" refers to a unit in a polymer that is derived from a monomer included in the polymerizable composition used to form the polymer. For example, the monomeric unit corresponding to the monomer acrylic acid ($CH_2$=CH—(C=O)—OH) is

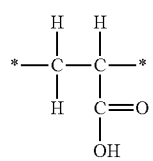

where each asterisk (*) indicates an attachment sight to another monomeric unit or a terminal group of the polymer.

As used herein, the term "pendent" refers to a group attached to the carbon-carbon backbone of the (meth)acrylate copolymer. The pendent carboxylic acid-containing group can optionally contain additional groups besides the carboxylic acid group (—(C=O—OH or a salt thereof). Likewise, a pendent phosphate-containing group can contain (and typically does contain) other groups besides the phosphate group.

The term "(meth)acrylate" refers to an acrylate and/or a methacrylate and the term "(meth)acrylic acid" refers to acrylic acid and/or (meth)acrylic acid As used herein, the terms "first (meth)acrylate copolymer having pendent carboxylic acid groups", "first (meth)acrylate copolymer", "precursor (meth)acrylate copolymer having pendent carboxylic acid groups", "precursor (meth)acrylate copolymer", and similar expressions are used interchangeably.

As used herein, the terms "second (meth)acrylate copolymer", "(meth)acrylate copolymer with pendent phosphate-containing groups", and other similar expressions are used interchangeably.

As used herein, the term "phosphate-containing group" refers to a group containing a group of Formula A.

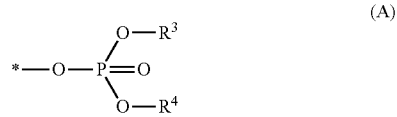

(A)

In Formula A, group $R^3$ is a C1-C4 alkyl, benzyl, or combines with $R^4$ to form a cyclic group with 5 or 6 ring members that can be optionally substituted with at least on C1-C3 alkyl. Group $R^4$ is a C1-C4 alkyl, benzyl, or combines with $R^3$ to form a cyclic group with 5 or 6 ring members that can be optionally substituted with at least one C1-C3 alkyl.

The term "C1-C4" referring to a group means that the group contains 1 to 4 carbon atoms. Similar expressions with other numbers likewise indicate the number of carbon atoms in the group.

The term "alkyl" refers to a monovalent group that is a radical of an alkane and includes straight-chain, branched, cyclic, and bicyclic groups, and combinations thereof. Unless otherwise indicated, the alkyl groups typically contain from 1 to 20 carbon atoms. In some embodiments, the alkyl groups contain 1 to 10 carbon atoms, 2 to 10 carbon atoms, 1 to 6 carbon atoms, 2 to 6 carbon atoms, 1 to 4 carbon atoms, or 2 to 4 carbon atoms. Cyclic alkyl groups and branched alkyl groups have at least three carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, isooctyl, isobornyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 20 carbon atoms. In some embodiments, the alkylene group has 1 to 10 carbon atoms, 2 to 10 carbon atoms, 1 to 6 carbon atoms, 2 to 6 carbon atoms, 1 to 4 carbon atoms, or 2 to 4 carbon atoms. Cyclic and branched alkylene groups have at least 3 carbon atoms. Suitable alkylene groups include, for example, methylene, ethylene, propylene, 1,4-butylene, 1,4-cyclohexylene, and 1,4-cyclohexyldimethylene.

The term "ether group" refers to an alkylene-oxy-alkylene group.

The terms "comprise", "contain", "include", and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether they materially affect the activity or action of the listed elements. Any of the elements or combinations of elements that are recited in this specification in open-ended language (e.g., comprise, include, contain, and derivatives thereof), are considered to additionally be recited in closed-ended language (e.g., consist and derivatives thereof) and in partially closed-ended language (e.g., consist essentially, and derivatives thereof).

Also, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

As used herein, the term "room temperature" refers to a temperature of 20° C. to 25° C. or 22° C. to 25° C.

The term "in the range" or "within a range" (and similar statements) includes the endpoints of the stated range.

DETAILED DESCRIPTION

A method of making a (meth)acrylate copolymer with at least one pendent phosphate-containing group as well as a pressure-sensitive adhesive composition that contains this copolymer are provided. The phosphate-containing groups can function as a flame retardant. Because the phosphate-containing groups are covalently bonded to the (meth)acrylate copolymer, they are not leached out over time as is typical of many known phosphorus-containing fire retardants.

The (meth)acrylate copolymer having a pendent phosphate-containing group is formed from a first (meth)acrylate copolymer (i.e., precursor (meth)acrylate copolymer) having pendent carboxylic acid-containing groups. The first (meth)acrylate copolymer is reacted with an epoxy-functionalized phosphate compound. More specifically, the pendent carboxylic acid-containing groups of the first (meth)acrylate copolymer can ring-open epoxy groups of the epoxy-functionalized phosphate compound resulting in the formation of a second (meth)acrylate copolymer with pendent phosphate-containing groups. The phosphate-containing groups are covalently attached to the second (meth)acrylate copolymer. The reaction between the carboxylic acid group of the precursor (meth)acrylate copolymer and the epoxy-functionalized phosphate compound tends to be highly effective with minimal by-product formation.

This method of forming the (meth)acrylate copolymer having pendent phosphate-containing groups offers many advantages over other known methods of introducing pendent phosphorus-containing groups into a polymeric material. For example, preparation of the phosphorus-containing monomers can be challenging and polymerizing the other monomers in the presence of the phosphorus-containing monomers can result in lower molecular weight polymeric material than may be desired. That is, the phosphorus-containing monomers can interfere with radical polymerization processes.

The epoxy-functionalized phosphate compound, the precursor (meth)acrylate copolymer with pendent carboxylic acid-containing groups, the method of forming the (meth)acrylate copolymer with pendent phosphate-containing groups, and the (meth)acrylate copolymer with a pendent phosphate-containing group is each described further below.

Epoxy-Functionalized Phosphate Compound

The epoxy-functionalized phosphate compound typically has a single epoxy group (oxirane group) and at least one phosphate group. Any known epoxy-functionalized phosphate compound can be used. The number of phosphate groups in the epoxy-functionalized phosphate compound is often equal to one, two, or three although the number of phosphate groups can be higher if desired. A single epoxy group is typically preferred to avoid crosslinking reactions of the precursor (meth)acrylate copolymer when reacted with the epoxy-functionalized phosphate compound.

Suitable epoxy-functionalized phosphate compounds are often of Formula (I).

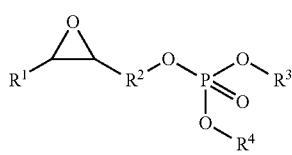

(I)

In Formula (I), group $R^1$ is hydrogen or methyl. Group $R^2$ is a C1-C8 alkylene or a C3-C8 ether group. Group $R^3$ is a C1-C4 alkyl, a benzyl, or combines with $R^4$ to form a cyclic group with 5 or 6 ring members that can be optionally substituted with a C1-C3 alkyl. Group $R^4$ is a C1-C4 alkyl, benzyl, or combines with $R^3$ to form a cyclic group with 5 or 6 ring members that can be optionally substituted with a C1-C3 alkyl.

Some specific epoxy-functionalized phosphate compounds of Formula (I) are of Formula (I-A).

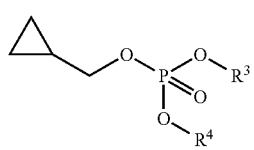

(I-A)

In Formula (I-A), group $R^1$ of Formula (I) is hydrogen and group $R^2$ of Formula (I) is methylene. Groups $R^3$ and $R^4$ are the same as defined for Formula (I).

Examples of epoxy-functionalized compounds of Formula (I-A) include, but are not limited to, phosphoric acid, dimethyl oxiranylmethyl ester where $R^3$ and $R^4$ are both methyl; phosphoric acid, diethyl oxiranylmethyl ester where $R^3$ and $R^4$ are both ethyl; phosphoric acid, dipropyl oxiranylmethyl ester where $R^3$ and $R^4$ are both propyl; phosphoric acid, ethyl methyl dimethyl oxiranylmethyl ester where $R^3$ is methyl and $R^4$ is ethyl; phosphoric acid, bis(1-methylethyl) oxiranylmethyl ester where $R^3$ and $R^4$ are both isopropyl; 1,3,2-dioxaphospholane, 2-(2-oxiranylmethoxy)-, 2-oxide where $R^3$ and $R^4$ combine to form a 5-membered ring; 1,3,2-dioxaphospholane, 4,5-dimethyl-2-(2-oxiranylmethoxy)-, 2-oxide where $R^3$ and $R^4$ combine to form 5-membered ring that is substituted with two methyl groups on adjacent carbon atoms; 1,3,2-dioxaphosphorinane, 2-(2-oxiranylmethoxy)-, 2-oxide where $R^3$ and $R^4$ combine to form 6-membered ring); 1,3,2-dioxaphosphorinane, 5,5-dimethyl-2-(2-oxiranylmethoxy)-, 2-oxide where $R^3$ and $R^4$ combine to form a 6-membered ring that is substituted with two alkyl groups on the same carbon atom); and phosphoric acid, oxiranylmethyl bis(phenylmethyl) ester where $R^3$ and $R^4$ are both benzyl.

Other epoxy-functionalized compounds of Formula (I) are of Formula (I-B).

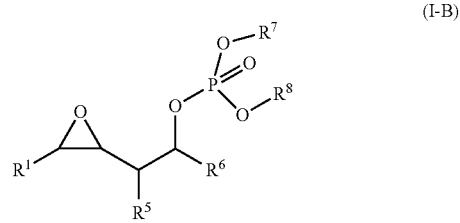

(I-B)

In Formula (I-B), group $R^1$ is hydrogen or a C1-C3 alkyl as described for Formula (I). In group —CH($R^5$)—CH($R^6$)— of Formula (I-B), $R^5$ is hydrogen or a C1-C3 alkyl and $R^6$ is a C1 to C3 alkyl. This group corresponds to the selection of an alkylene group for group $R^2$ of Formula (I). Groups $R^7$ and $R^8$ in Formula (I-B) are each a subset of groups $R^3$ and $R^4$ respectively in Formula (I) with $R^7$ and $R^8$ in Formula (I-B) each being a C1-C3 alkyl.

Examples of epoxy-functionalized compounds of Formula (I-B) include, but are not limited to, xylitol, 1,2-anhydro-3,5-dideoxy-3-methyl-, diethyl phosphate where $R^1$ is hydrogen, $R^5$ is methyl, $R^6$ is methyl, $R^7$ is ethyl, and $R^8$ is ethyl; phosphoric acid, diethyl 1-[(3-methyloxiranyl)methyl]propyl ester where $R^1$ is methyl, $R^5$ is hydrogen, $R^6$ is propyl, $R^7$ is ethyl, and $R^8$ is ethyl; and pentitol, 1,2-anhydro-3,5-dideoxy-, 4-(diethyl phosphate) where $R^1$ is hydrogen, $R^5$ is hydrogen, $R^6$ is methyl, $R^7$ is ethyl, and $R^8$ is ethyl.

Still other epoxy-functionalized compounds of Formula (I) are of Formula (I-C).

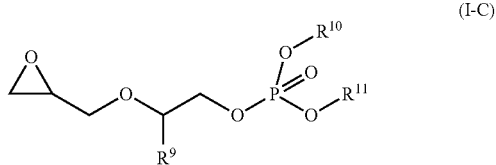

(I-C)

In Formula (I-C), group $R^9$ is hydrogen or a C1-C3 alkyl and the group —CH$_2$—O—CH($R^9$)—CH$_2$— in Formula (I-C) corresponds to the selection of a C3-C8 ether group for $R^2$ in Formula (I). Each group $R^{10}$ and $R^{11}$ in Formula (I-C) is a C1-C3 alkyl, which corresponds to a subset of groups $R^3$ and $R^4$ of Formula (I).

Examples of epoxy-functionalized compounds of Formula (I-C) include, but are not limited to, CAS Number 2620837-91-2 where $R^9$, $R^{10}$, and $R^{11}$ are each methyl; and CAS Number 2620837-90-2 where $R^9$ is hydrogen, $R^{10}$ is methyl, and $R^{11}$ is methyl.

Yet other epoxy-functionalized compounds are of Formula (II).

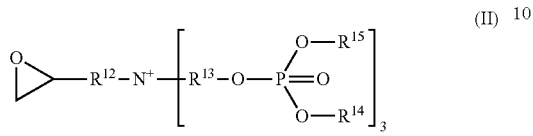

In Formula (II), $R^{12}$ is an alkylene having 1 to 2 carbon atoms, $R^{13}$ is an alkylene having 2 to 4 carbon atoms, $R^{14}$ is a C1-C4 alkyl or combines with $R^{15}$ to form a cyclic group with 5 or 6 ring members that is optionally substituted with a C1-C3 alkyl, and $R^{15}$ is a C1-C4 alkyl or combines with $R^{14}$ to form a cyclic group with 5 or 6 ring members that is optionally substituted with a C1-C3 alkyl. The structure shown in Formula (II) is a cation and there is an anion associated with the cation that is not shown in the formula. The anion is typically a halide but can be other anions as well.

An example of Formula (II) is 2-(oxiranemethaneammonium), N,N,N-tris(2-hydroxyethyl diethyl phosphate) as shown below.

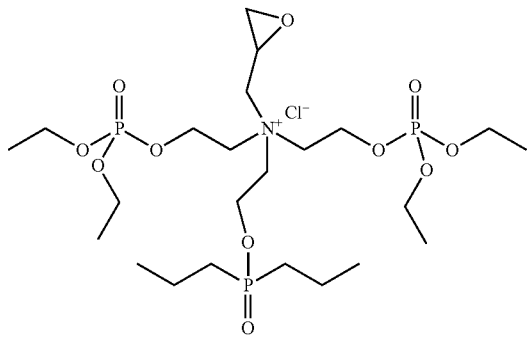 [SMILES: CCCP(=O)(CCC)OCC[N+](CCOP(=O)(OCC)OCC)(CCOP(=O)(OCC)OCC)CC1CO1 ; [Cl-]]

This compound is of Formula (II) where $R^{12}$ is methylene, $R^{13}$ is methylene, $R^{14}$ is ethyl, and $R^{15}$ is ethyl.

In many embodiments, the epoxy-functionalized phosphate compound is of Formula (I). In some applications where high adhesive strength in necessary, salts such as those of Formula (II) may negatively impact the adhesive properties of the second (meth)acrylate copolymer when used as a pressure-sensitive adhesive. In some embodiments, however, the epoxy-functionalized phosphate compound is of Formula (II) and is advantageously used because of the higher phosphate content that may facilitate improved fire retardation.

Precursor (meth)acrylate Copolymer with Pendent Carboxylic Acid-Containing Groups The precursor (meth)acrylate copolymer has pendent carboxylic acid-containing groups that can react with the epoxy-functionalized phosphate compound. Any suitable monomer having a carboxylic acid-containing group can be included in the monomer mixture used to form the precursor (meth)acrylate copolymer.

Example monomers having a carboxylic acid-containing groups include, but are not limited to, acrylic acid, methacrylic acid, itaconic acid, fumaric acid, crotonic acid, citraconic acid, maleic acid, oleic acid, and 2-carboxyethyl (meth)acrylate. In most embodiments, the monomer having the carboxylic acid-containing group is acrylic acid, methacrylic acid, or a mixture thereof.

The monomer having a carboxylic acid-containing group can be present in an amount ranging from 0.1 to 25 weight percent based on a total weight of monomers in the monomer mixture used to form the precursor (meth)acrylate copolymer. Stated similarly, the precursor (meth)acrylate copolymer contains 0.1 to 25 weight percent monomeric units having a pendent carboxylic acid-containing group based on the total weight of the precursor (meth)acrylate copolymer. The amount can be at least 0.1, at least 0.2, at least 0.3, at least 0.5, at least 1, at least 2, at least 3, at least 5, at least 10, at least 15, or at least 20 weight percent and up to 25, up to 20, up to 15, up to 10, or up to 5 weight percent. The range can be, for example, from 0.1 to 20, from 1 to 20, from 0.1 to 15, from 1 to 15, from 0.1 to 10, from 1 to 10 weight percent based on the total weight of the precursor (meth)acrylate copolymer and/or based on the total weight of monomers in the monomer mixture.

The precursor (meth)acrylate is often selected to be a pressure-sensitive adhesive so that the resulting (meth)acrylate copolymer having pending phosphate-containing groups will also be a pressure-sensitive adhesive. That is, the monomers are selected to form a precursor (meth)acrylate copolymer that is an elastomeric material. The elastomeric material typically has a glass transition temperature (Tg) that is no greater than 20° C. no greater than 10° C. no greater than 0° C. no greater than –10° C. no greater than –20° C. no greater than –30° C. no greater than –40, or no greater than –50° C. The glass transition temperature can be measured using techniques such as Differential Scanning calorimetry and Dynamic Mechanical Analysis. Alternatively, the glass transition temperature can be estimated using the Fox equation. Lists of glass transition temperatures for homopolymers are available from multiple monomer suppliers such as from BASF Corporation (Houston, TX. USA). Polyscience. Inc. (Warrington. PA. USA), and Aldrich (Saint Louis, Missouri. USA) as well as in various publications such as, for example, Mattioni et al., *J. Chem. Inf. Comput. Sci.*, 2002, 42, 232-240.

To form an elastomeric precursor (meth)acrylate copolymer, the monomeric composition often contains at least one low-Tg monomer. As used herein, the term "low-Tg monomer" refers to a monomer having a Tg no greater than 20° C. when homopolymerized (i.e., a homopolymer formed from the low-Tg monomer has a Tg no greater than 20° C.). Suitable low-Tg monomers are often selected from alkyl (meth)acrylates, heteroalkyl (meth)acrylates, aryl substituted alkyl acrylates, and aryloxy substituted alkyl acrylates.

Example low-Tg alkyl (meth)acrylate monomers often are non-tertiary alkyl acrylates but can be an alkyl methacrylate having a linear alkyl group with at least 4 carbon atoms. Specific examples of alkyl (meth)acrylates include, but are not limited to, methyl acrylate, ethyl acrylate, n-propyl acrylate, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, and n-dodecyl methacrylate.

Example low-Tg heteroalkyl (meth)acrylate monomers often have at least 3, at least 4, or at least 6 carbon atoms and can have up to 30 or more, up to 20, up to 18, up to 16, up to 12, or up to 10 carbon atoms. Specific examples of heteroalkyl (meth)acrylates include, but are not limited to, 2-ethoxyethyl acrylate, 2-(2-ethoxyethoxy)ethyl acrylate, 2-methoxyethyl (meth)acrylate, and tetrahydrofurfuryl (meth)acrylate.

Exemplary aryl-substituted alkyl acrylates or aryloxy-substituted alkyl acrylates include, but are not limited to, 2-biphenylhexyl acrylate, benzyl acrylate, 2-phenoxyethyl acrylate, and 2-phenylethyl acrylate.

The monomer mixture used to form the precursor (meth)acrylate copolymer often contains at least 40 weight percent of a low-Tg monomer based on a total weight of monomers in the monomer mixture used to form the precursor (meth)acrylate. In some embodiment, the monomer mixture contains at least 45, at least 50, at least 60, at least 65, at least 70, at least 75, or at least 80 weight percent and up to 99.9, up to 99, up to 98, up to 95, up to 90, up to 85, up to 80, or up to 75 weight percent of the low-Tg monomer.

The monomer mixture used to form the precursor can optionally include a high-Tg monomer. As used herein, the term "high-Tg monomer" refers to a monomer that has a Tg greater than 30° C., greater than 40° C., or greater than 50° C. when homopolymerized (i.e., a homopolymer formed from the monomer has a Tg greater than 30° C. greater than 40° C., or greater than 50° C.). Some suitable high-Tg monomers have a single (meth)acryloyl group such as, for example, methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth)acrylate, stearyl (meth)acrylate, phenyl acrylate, benzyl methacrylate, 3,3,5-trimethylcyclohexyl (meth)acrylate, 2-phenoxyethyl methacrylate, N-octyl (meth)acrylamide, and mixtures thereof. Other suitable high-Tg monomers have a single vinyl group that is not a (meth)acryloyl group such as, for example, various vinyl ethers (e.g., vinyl methyl ether), vinyl esters (e.g., vinyl acetate and vinyl propionate), styrene, substituted styrene (e.g., a-methyl styrene), vinyl halide, and mixtures thereof. Vinyl monomers having a group characteristic of polar monomers are considered herein to be polar monomers.

The amount of high-Tg monomer can be up to 50 weight percent or even higher provided that the Tg of the (meth)acrylate copolymer is no greater than 20° C. In some embodiments, the amount can be up to 40, up to 30, up to 20, up to 15, or up to 10 weight percent. The amount can be at least 0.1, at least 0.5, at least 1, at least 2, or at least 5 weight percent. For example, the amount can be in a range of 0 to 50, 0 to 40, 0 to 30, 0 to 20, 0 to 10, 1 to 30, 1 to 20, or 1 to 10 weight percent. The amount values are based on a total weight of monomers in the monomer mixture used to form the precursor (meth)acrylate copolymer.

The monomer mixture can include other polar monomers in addition to the monomer having the carboxylic acid-containing group. The non-acidic polar group can be a hydroxyl group, a primary amido group, a secondary amido group, a tertiary amido group, an amino group, or an ether group. Having polar groups can facilitate adherence of the pressure-sensitive adhesive to a variety of substrates. The polar group is typically not an epoxy group that could react with the pendent carboxylic acid-containing groups resulting in crosslinking of the precursor (meth)acrylate copolymer.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide or 3-hydroxypropyl (meth)acrylamide), ethoxylated hydroxyethyl (meth)acrylate (e.g., monomers commercially available from Sartomer (Exton, PA, USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, or N-octyl (meth)acrylamide. Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

Polar monomers with ether linkages include those that contain poly(alkylene oxide) segments such as poly(ethylene oxide) (meth)acrylate, poly(propylene oxide) (meth)acrylate, poly(tetramethylene oxide) (meth)acrylate, di(ethylene glycol) ethyl ether (meth)acrylate, and the like. Any suitable molecular weight monomer can be used.

The amount of the optional non-acidic polar monomer is often in a range of 0 to 15 weight percent based on the weight of monomers in the monomer mixture used to form the precursor (meth)acrylate copolymer. If present, the amount of non-acidic polar monomers in the monomer mixture is often at least 0.1, 0.2, 0.5, or 1 weight percent based on the total weight of monomers in the monomer mixture. The amount can be up to 15, up to 10, or up to 5 weight percent. For example, the amount is often in a range of 0 to 15, 0.1 to 10, 0.5 to 5, or 1 to 5 weight percent based on a total weight of monomers in the monomer mixture.

Overall, the precursor (meth)acrylate copolymer can be formed from a monomer mixture that contains 0.1 to 25 weight percent monomer having a carboxylic acid-containing group, 40 to 99.9 weight percent low-Tg monomer, 0 to 50 weight percent high-Tg monomer, and 0 to 15 weight percent non-acidic polar monomer. In other embodiments, the monomer mixture contains 1 to 20 weight percent monomer having a carboxylic acid-containing group, 50 to 99 weight percent of the low-Tg monomer, 0 to 40 weight percent high-Tg monomer, and 0 to 10 weight percent non-acidic polar monomer. In yet other embodiments, the monomer mixture contains 5 to 20 weight percent monomer having a carboxylic acid-containing group, 50 to 95 weight percent of the low-Tg monomer, 0 to 30 weight percent high-Tg monomer, and 0 to 10 weight percent non-acidic polar monomer. In still other embodiments, the monomer mixture contains 5 to 15 weight percent monomer having a carboxylic acid-containing group, 60 to 95 weight percent of the low-Tg monomer, 0 to 20 weight percent high-Tg monomer, and 0 to 10 weight percent non-acidic polar monomer. The sum of all the monomers is 100 weight percent.

The weight average molecular weight of the (meth)acrylate copolymer is often in a range of 10,000 Da to 1,000,000 Da or even higher when the (meth)acrylate copolymer is crosslinked. For example, the weight average molecular weight can be at least 20,000 Da, at least 30,000 Da, at least 40,000 Da, or at least 50,000 and can be up to 1,000,000 Da, up to 900,000 Da, up to 800,000 Da, up to 700,000 Da, or up to 600,000 Da.

An initiator is typically added to the monomer mixture to prepare the precursor (meth)acrylate copolymer. The amount of the initiator is often in a range of 0.01 to 1 weight percent based on a total weight of monomers in the monomer mixture.

Exemplary thermal initiators include various azo compounds such as those commercially available under the trade designation VAZO from Chemours Co. (Wilmington. DE. USA) including VAZO 67, which is 2,2-azobis(2-methylbutane nitrile), VAZO 64, which is 2,2'-azobis(isobutyronitrile), VAZO 52, which is (2,2-azobis(2,4-dimethylpentanenitrile), and VAZO 88, which is 1,1'-azobis(cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, PA, USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation OMNIRAD 651 from iGM Resins (Charlotte, NC, USA) or under the trade designation ESACURE KB-1 from Sartomer (Exton, PA, USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation OMNIRAD184), bis(2,4,6-trimethylbenzoyl)phenyl phosphine oxide (commercially available under the trade designation OMNIRAD 819), 1-[4-(2-hydroxyethoxy)phenyl]-2-hydroxy-2-methyl-1-propane-1-one (commercially available under the trade designation OMNIRAD 2959), 2-benzyl-2-dimethylamino-1-(4-morpholinophenyl) butanone (commercially available under the trade designation OMNIRAD 369), 2-methyl-1-[4-(methylthio)phenyl]-2-morpholinopropan-1-one (commercially available under the trade designation OMNIRAD 907), and 2-hydroxy-2-methyl-1-phenyl propan-1-one (commercially available under the trade designation DAROCUR 1173 from BASF Corp. (Florham Park, NJ, USA)).

The precursor (meth)acrylate is often prepared in an organic solvent so that it can be easily reacted with the epoxy-functionalized phosphate compound after preparation. Suitable solvents include, but are not limited to, methanol, ethanol, isopropanol, tetrahydrofuran, heptane, acetone, methyl ethyl ketone, methyl isobutyl ketone, 1-methoxy-2-propanol, methyl acetate, ethyl acetate, butyl acetate, acetone, toluene, xylene, ethylene glycol alkyl ether, and the like. These solvents can be used alone or as mixtures. The reaction mixture can contain any suitable amount of the organic solvent such as up to 80, up to 70, up to 60, up to 50, up to 40, or up to 30 weight percent based on the total weight of the reaction mixture.

(Meth)acrylate Copolymer with Pendent Phosphate-Containing Groups

The precursor (meth)acrylate copolymer (i.e., first (meth)acrylate copolymer) having pendent carboxylic acid-containing groups is reacted with the epoxy-functionalized phosphate compound to form the second (meth)acrylate copolymer having pendent phosphate-containing groups. This reaction is often performed in the presence of the organic solvent that is present during the formation of the precursor (meth)acrylate copolymer. Alternatively, if the precursor (meth)acrylate copolymer is prepared in the absence of an organic solvent or in the present of a low amount of the organic solvent, an organic solvent can be added to the reaction mixture used to form the second (meth)acrylate copolymer having pendent phosphate-containing groups. Suitable organic solvents and amounts are the same as those listed above for use in the preparation of the precursor (meth)acrylate copolymer.

If the precursor (meth)acrylate copolymer has (meth)acrylic acid monomeric units, then the monomeric groups formed by reaction of an epoxy-functionalized phosphate compound of Formula (I) are of Formula (III) as shown in Reaction Scheme A.

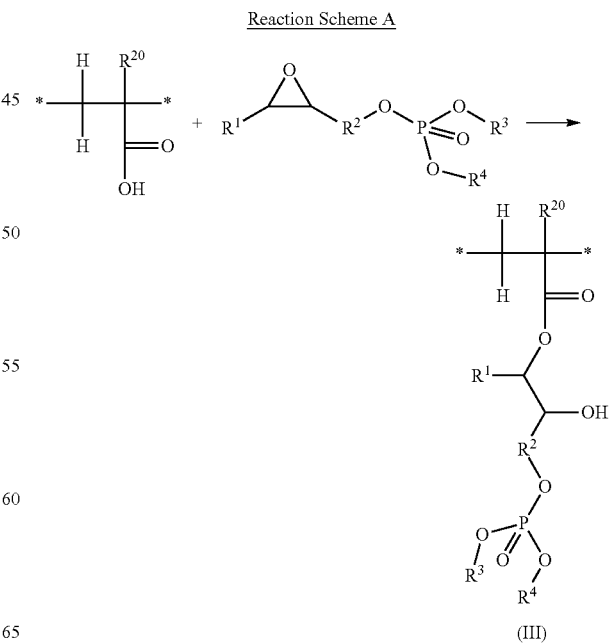

In Formula (III), group $R^{20}$ is hydrogen or methyl. Group $R^1$ is hydrogen or a C1-C3 alkyl. Group $R^2$ is a C1-C8 alkylene or a C3-C8 ether group. Group $R^3$ is a C1-C4 alkyl, a benzyl, or combines with $R^4$ to form a cyclic group with 5 or 6 ring members that can be optionally substituted with a C1-C3 alkyl. Group $R^4$ is a C1-C4 alkyl, benzyl, or combines with $R^3$ to form a cyclic group with 5 or 6 ring members that can be optionally substituted with a C1-C3 alkyl.

When the epoxy-functionalized phosphate compound is of Formula (I-A), the reaction product after reaction with a (meth)acrylic monomeric unit is a monomeric unit of Formula (III-A).

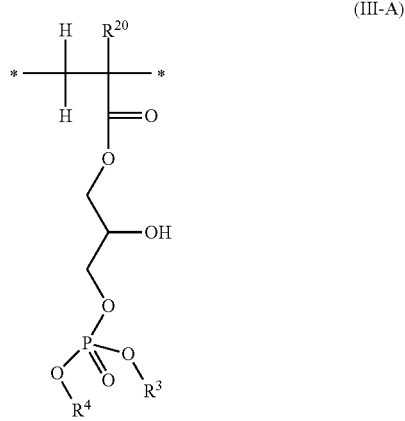

(III-A)

In Formula (III-A), groups $R^{20}$, $R^3$, and $R^4$ are the same as described above.

The pendent group in Formula (III-A) is —(C=O)—O—$CH_2$—CH(OH)—$CH_2$—O—(P=O)($OR^3$)($OR^4$). Similarly, the pendent group of the reaction product of a (meth)acrylic monomeric unit with an epoxy-functionalized phosphate compound of Formula (I-B) is —(C=O)—O—$CHR^1$—CH(OH)—$CHR^5$—$CHR^6$—O—(P=O)($OR^7$)($OR^8$), and with an epoxy-functionalized phosphate compound of Formula (I-C) is —(C—O)—O—$CH_2$—CH(OH)—$CH_2$—O—$CHR^9$—$CH_2$—O—(P=O)($OR^{10}$)($OR^{11}$). The groups $R^3$, $R^4$, $R^5$, $R^6$, $R^7$, $R^8$, $R^9$, $R^{10}$, and $R^{11}$ are the same as described above.

Likewise, if the precursor (meth)acrylate copolymer has (meth)acrylic acid monomeric units, then the monomeric unit formed by reaction of an epoxy-functionalized phosphate compound of Formula (II) are of Formula (IV).

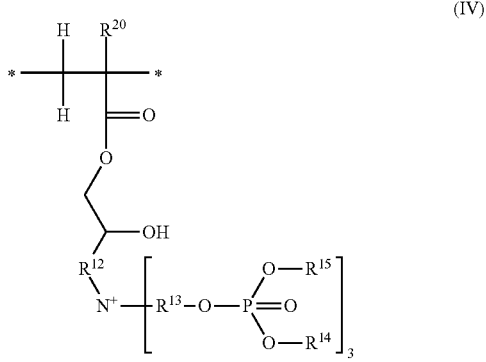

(IV)

Groups $R^{20}$, $R^{12}$, $R^{14}$, and $R^{15}$ are the same as described above.

Typically, about 25 to 100 mole percent of the monomeric units having a carboxylic acid-containing group in the precursor (meth)acrylate copolymer are reacted with the epoxy-functionalized phosphate compound to produce the (meth)acrylate copolymer having pendent phosphate-containing groups (i.e., the second (meth)acrylate copolymer). The conversion of the monomeric units having a pendent carboxylic acid-containing group to monomeric units having a pendent phosphate-containing group is at least 25, at least 30, at least 35, at least 40, at least 50, at least 60, at least 70, or at least 75 mole percent and can be up to 100, up to 95, up to 90, up to 85, up to 80, up to 75, up to 70, up to 65, up to 60, up to 55, or up to 50 mole percent based on total moles of monomeric units having a pendant carboxylic acid-containing group in the precursor (meth)acrylate copolymer. It can be advantageous to retain at least some of the monomeric units having a pendent carboxylic acid-containing group to enhance adhesion of the pressure-sensitive adhesive composition to various substrate. On the other hand, a higher amount of the phosphate-containing groups tends to enhance the fire retarding characteristics of the pressure-sensitive adhesive. These two characteristics are considered to determine the best balance of pendent groups for a particular application.

In some embodiments, the second (meth)acrylate copolymer having pendent phosphate-containing groups contains 0.1 to 10 weight percent phosphorus-containing monomeric units based on a total weight of the second (meth)acrylate copolymer. The amount can be at least 0.1, at least 0.2, at least 0.3, at least 0.5, at least 1, at least 2, at least 3, at least 4, or at least 5 weight percent and up to 10, up to 9, up to 8, up to 7, up to 6, up to 5, up to 4, up to 3, or up to 2 weight percent.

In some embodiments, the second (meth)acrylate copolymer with pendent phosphate-containing groups is halogen free. In these embodiments, the epoxy-functionalized phosphate compound is not a chloride salt.

The second (meth)acrylate compound is free of other phosphorus-containing groups other than phosphate-containing groups of Formula (A). That is, the second (meth) acrylate copolymer is free or substantially free of phosphinate groups and phosphonate groups. As used herein with respect to phosphinate and/or phosphonate groups, the second (meth)acrylate copolymer contains less than 0.1 weight percent monomeric units with these phosphorus-containing pendent groups. The amount is often less than 0.05 or less than 0.01 weight percent based on the total weight of the second (meth)acrylate copolymer.

Coating Compositions

To form a pressure-sensitive adhesive article containing the second (meth)acrylate copolymer having pendent phosphate-containing groups, a coating composition is positioned adjacent to a substrate. The coating composition typically includes the second (meth)acrylate copolymer and an organic solvent such as those discussed above. These coating compositions can be prepared so that they are clear to the visible eye.

In some embodiments, the coating composition further includes an optional tackifier. Useful tackifiers include, for example, rosin ester resin, terpene phenol resins, and hydrocarbon resins. The amount of the optional tackifier if often in a range of 0 to 30 weight percent based on the solids content of the coating composition. If present, the amount of tackifier can be at least 5, at least 10, at least 15, or at least 20 weight percent and up to 40, up to 35, up to 30, up to 25, or up to 20 weight percent based on the total weight of solids in the coating composition.

Other components that are commonly added to pressure-sensitive adhesives can be included in the coating composition. Such components include, for example, antioxidants, fillers, pigments, and the like. Any suitable amount can be used provided that the coating composition upon drying is a pressure-sensitive adhesive.

Pressure-Sensitive Adhesive Articles

The coating composition is typically applied adjacent to a substrate to provide a pressure-sensitive adhesive article. The term "adjacent" means that the coating composition contacts the substrate or is separated by another layer such as an adhesion promoting layer. The pressure-sensitive adhesive article typically includes a layer of a permanent or temporary substrate.

Any suitable substrate can be used. For example, the substrate can be flexible or inflexible and can be formed from a polymeric material, glass or ceramic material, metal (including various alloys), or combination thereof. In many embodiments, the substrate is glass, ceramic material, or a metal. In other embodiments, the substrate is a polymeric material such as, for example, a polymeric film or a plastic composite (e.g., glass or fiber filled plastics). The polymeric film can be prepared, for example, from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl (meth)acrylates (PMMA), ethylene-vinyl acetate copolymers, polyamides, cellulosic materials (e.g., cellulose acetate, cellulose triacetate, and ethyl cellulose), and the like. These substrates are permanent substrates because they cannot be easily removed from the pressure-sensitive adhesive composition.

In some embodiments, the substrate is a temporary substrate such as a release liner. The role of the temporary substrate is to provide support for the pressure-sensitive adhesive composition until it is applied to a permanent substrate. Such articles are often referred to as transfer tapes. The release liner can be one or both outer surfaces of a pressure-sensitive adhesive layer. Suitable release liners typically have low affinity for the pressure-sensitive adhesive curable composition. Exemplary release liners can be prepared from paper (e.g., Kraft paper) or other types of polymeric material. Some release liners are coated with an outer layer of a release agent such as a silicone-containing material or a fluorocarbon-containing material (e.g., polyfluoropolyether or polyfluoroethylene).

When the coating composition contains an organic solvent, the coating is applied to a substrate, which can be either permanent or temporary, and then dried to remove the organic solvent. The drying temperature can be at room temperature (e.g., 20 to 25 degrees Celsius) or higher.

The resulting articles can have flame retardant characteristics. For example, the article can have a flammability rating of UL94 VTM-0.

EXAMPLES

Unless otherwise noted, all parts, percentages, ratios, etc. in the Examples and the rest of the specification are by weight. Preparative Examples are identified by the label prefix "PE", Comparative Examples are identified by the label prefix "CE", and working Examples are identified by the label prefix "EX".

Unless otherwise indicated, all other reagents were obtained, or are available from fine chemical vendors such as MilliporeSigma, Burlington, MA, USA or may be synthesized by known methods. Table 1 (below) lists materials used in the examples and their sources.

TABLE 1

| DESIGNATION | DESCRIPTION |
| --- | --- |
| Diethyl chlorophosphate | Diethyl chlorophosphate obtained from MilliporeSigma (Burlington, MA, USA) |
| Glycidol | Glycidol obtained from MilliporeSigma |
| TEA | Triethylamine obtained from MilliporeSigma |
| Tol | Toluene obtained from MilliporeSigma |
| Triethanolamine | Triethanolamine obtained from MilliporeSigma |
| Epichlorohydrin | Epichlorohydrin obtained from MilliporeSigma |
| VAZO 67 | 2,2'-Azobis(2-methylbutyronitrile) obtained as VAZO-67 from MilliporeSigma |
| EA | Ethyl Acetate obtained from MilliporeSigma |
| EHA | 2-ethylhexyl acrylate obtained from MilliporeSigma |
| AA | Acrylic acid obtained from MilliporeSigma |
| DEPP | Diethyl 1-propylphosphonate obtained from Alfa Aesar (Ward Hill, Massachusetts) |
| FRRA1 | Epoxy-functionalized monophosphate compound synthesized as described in Preparative Example PE1 |
| TATP | Tertiary-amine-functionalized triphosphate compound synthesized as described in Preparative Example PE2 |
| FRRA2 | Epoxy-functionalized triphosphate compound synthesized as described in Preparative Example PE2 |
| PRECURSOR COPOLYMER | Precursor (meth)acrylate copolymer solution synthesized as described in Preparative Example PE3 |
| KAPTON HN | General purpose polyimide film obtained from DuPont (Wilmington, DE) having a thickness of 0.05 mm |
| PET | HOSTAPHAN 3SAB PET Film from Mitsubishi (Greer, SC, USA) |

Test Methods

UL94 VTM Flammability Test

The adhesive samples were laminated between 0.05 mm thick Kapton polyimide films. The laminated samples (adhesive positioned between two polyimide films) were about 0.25 mm thick. The UL94 VTM test developed by UL, LLC (Northbrook, IL, USA) was used to rate the flammability of these laminate samples, except that the samples were not subjected to any pre-treatment. Each sample was wrapped around a mandrel before clamping to the stand. In this test, the flame from a Bunsen burner was applied for 3 seconds(s), twice. The second flame application time begins as soon as the first burning time ends. The flame height was 20 mm. The flammability ratings possible in the UL94 VTM test are described in Table 2 below.

TABLE 2

| FLAMMABILITY RATING UL94 VTM | | | |
|---|---|---|---|
| TEST CRITERIA | VTM-0 | VTM-1 | VTM-2 |
| Burning time (s) of each individual test specimen (after first and second flame applications) | ≤10 | ≤30 | ≤30 |
| Total burning time (s) | ≤50 | ≤250 | ≤250 |
| Burning and afterglow times (s) after second flame application | ≤30 | ≤60 | ≤60 |
| Dripping of burning specimens (ignition of cotton batting) | No | No | Yes |
| Combustion up to holding clamp (specimens completely burned) | No | No | No |

90° Angle Peel Adhesion Strength Test

Peel adhesion strength was measured at 90° angle using an IMASS SP-200 slip/peel tester (available from IMASS Inc., Accord, MA, USA) at a peel rate of 305 mm/minute (12 inches/minute). Test panels were prepared by wiping the panels with a tissue wetted with isopropyl alcohol (IPA) using heavy hand pressure to wipe the panel 8-10 times. This procedure was repeated two more times with clean tissues wetted with the solvent. The cleaned panel was allowed to dry. The adhesive tape was cut into strips measuring 1.27 cm×20 cm (½ in.×8 in.) and the strips were rolled down onto the cleaned panel with a 2.0 kg (4.5 lb.) rubber roller using 2 passes. The prepared samples were stored at 23° C. and 50% relative humidity for 24 hours before testing. Two samples were tested for each example and averaged values were expressed in N/cm. Failure mode was noted and recorded as COH—cohesive (i.e., the adhesive split leaving residue on both the tape and test surface), ADH—adhesive (i.e., the adhesive peeled cleanly from the test surface), and/or 2-B (2-Bond)—the adhesive peeled away from the backing.

Preparative Example PE1: FRRA1

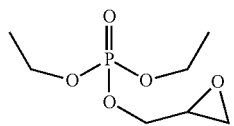

An epoxy-functionalized monophosphate (Flame-Retardant Reactive Additive 1 or FRRA1) was synthesized by reacting diethyl chlorophosphate and glycidol. Into a 250-mL round-bottom flask, 20.63 g of diethyl chlorophosphate (0.22 mol), 40.48 g of triethylamine (0.4 mol), and 100 g of toluene were placed. The flask was placed in an ice bath (0° C.) and the mixture was stirred with a magnetic stirrer to make a homogeneous solution. Then, 14.82 g of glycidol (0.2 mol) was added into the solution dropwise for 30 min. When the addition was completed, the mixture was allowed to reach room temperature and was kept at room temperature with stirring for 1 day to complete the reaction. After 1 day, insoluble white solids were removed by a simple filtering with a sintered fritted disc funnel (pore size 10-20 μm). The reaction solvent and unreacted reagents were removed by a rotary evaporator under reduced pressure. A slightly yellow transparent liquid was obtained.

Preparative Example PE2: FRRA2

The synthesis of the epoxy-functionalized triphosphate additive (Flame-Retardant Additive 2 or FRRA2) was carried out in two major steps. First, a tertiary-amine-functionalized triphosphate (TATP) was synthesized and isolated as a synthetic intermediate. Second, the TATP was reacted with epichlorohydrin to obtain FRRA2 as the final product.

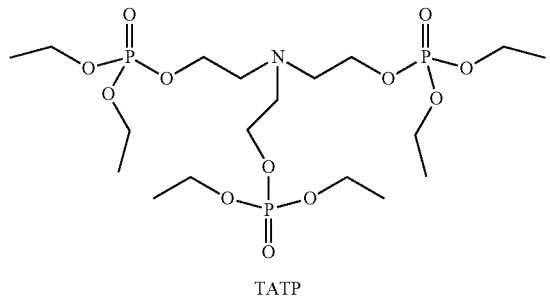 [SMILES: CCOP(=O)(OCC)OCCN(CCOP(=O)(OCC)OCC)CCOP(=O)(OCC)OCC]

TATP

Tertiary-amine-functionalized triphosphate (TATP) was synthesized as follows. The first step was reacting diethyl chlorophosphate and triethanolamine. In a 250-mL round-bottom flask, 56.94 g of diethyl chlorophosphate (0.33 mol), 60.71 g of triethylamine (0.6 mol), and 100 g of toluene were placed. The flask was placed in an ice bath (0° C.) and the mixture was stirred with a magnetic stirrer to make a homogeneous solution. Then 14.92 g of triethanolamine (0.1 mol) was added into the solution dropwise for 30 min. When the addition was completed, the mixture was allowed to reach room temperature and was kept at room temperature with stirring for 1 day to complete the reaction. After 1 day, insoluble white solids were removed by a simple filtering with a sintered fritted disc funnel (pore size 10-20 μm). The reaction solvent and unreacted reagents were removed by a rotary evaporator under reduced pressure. TATP was obtained as a slightly yellow transparent liquid.

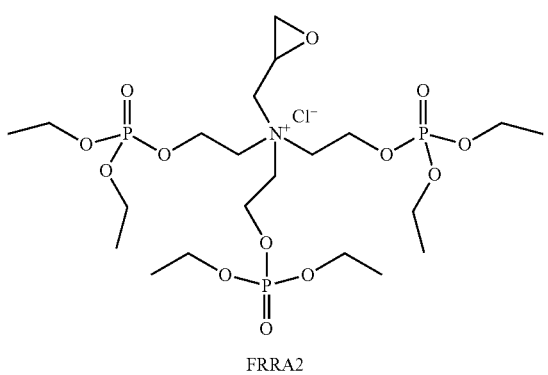

FRRA2

Epoxy-functionalized triphosphate additive (Flame-Retardant Reactive Additive 2 or FRRA2) was synthesized as follows. First, 11.15 g of TATP (0.02 mol) and 1.85 g (0.02 mol) of epichlorohydrin were placed in a 40-mL vial. The vial was placed on a mixing roller and was mixed for 24 hours at room temperature. The final product (FRRA2) was analyzed by $^1$H and $^{13}$C NMR and its chemical structure was confirmed.

Preparative Example PE3: Precursor Copolymer

The precursor (meth)acrylate copolymer was prepared by radical polymerization of two monomers: 2-EHA (186.0 g), and AA (14.0 g). The monomers were mixed with a polymerization solvent (ethyl acetate, 300.0 g) to reach a monomer concentration of 40.0 wt. % and a thermal radical initiator (VAZO 67, 0.2 wt. % to total monomer, 0.4 g) in amber, narrow-necked pint bottles at room temperature. The solutions were de-aerated by purging with nitrogen gas for 5 minutes at room temperature. The bottle was capped tightly and put in a LAUNDER-O-METER (SDL Atlas USA, Rock Hill, SC, USA) at 60° C. for 24 hours. The bottle was cooled to room temperature and the resulting copolymer solution was used in Example formulations.

Examples EX1 to EX4 and Comparative Examples CE1 to CE3

The compositions in the Table 3 were combined in 40-mL vials and placed on a mixing roller. The solutions were mixed on the roller for at least 24 hours at room temperature. The formulations with the reactive additives (FRRA1, FRRA2) showed viscosity increase during the mixing due to the ring-opening reaction between the precursor (meth)acrylate copolymer and the epoxy-functionalized phosphate compound. All coating solutions were transparent and homogeneous.

Coatings were prepared by using a square applicator (wet gap thickness: 0.2 mm) on PET (for adhesion testing) and KAPTON HN (for flammability testing) backings. The coatings were dried in a convection oven for at least 30 minutes at 70° C. The dried coatings were stored under controlled temperature and humidity (23° C., 50% relative humidity) for at least 24 hours before evaluations.

The dried coatings of the materials in Table 3 (those on KAPTON HN films) were prepared and tested according to the procedure for the UL94 VTM Flammability Test. The results are shown in Table 4.

TABLE 4

| | UL94 VTM FLAMMABILITY TEST | | |
|---|---|---|---|
| EXAMPLE | FIRST APPLICATION, s | SECOND APPLICATION, s | RATING |
| COMPARATIVE EXAMPLE CE1 | 16 | — | FAIL |
| COMPARATIVE EXAMPLE CE2 | 18 | — | FAIL |
| COMPARATIVE EXAMPLE CE3 | 17 | — | FAIL |
| EX1 | 2 | 7 | VTM-0 |
| EX2 | 9 | 0 | VTM-0 |
| EX3 | 1 | 6 | VTM-0 |
| EX4 | 2 | 0 | VTM-0 |

The adhesive with no flame retardant and the adhesives with the non-reactive flame retardant all burned to the top on the first application of the flame. The coatings containing the reactive monophosphate and triphosphate stopped burning quickly, before the flame reached the sample's end. Even upon the second application, the flame went out before 10 seconds to achieve the VTM0 rating.

The dried coatings of the materials in Table 3 (those on PET films) were prepared and tested according to the procedure for the 90° Angle Peel Adhesion Strength Test. The results are shown in Table 5.

TABLE 5

| EXAMPLE | ADHESION ON STAINLESS STEEL, N/cm | ADHESION ON GLASS, N/cm | FAILURE MODE |
|---|---|---|---|
| COMPARATIVE EXAMPLE CE1 | 1.6 | 2.6 | ADH |
| COMPARATIVE EXAMPLE CE2 | 1.4 | 2.4 | ADH |
| COMPARATIVE EXAMPLE CE3 | 1.8 | 2.6 | ADH |

TABLE 3

| EXAMPLE | PRECURSOR COPOLYMER (40% solid) (g) | FLAME RETARDANT | AMOUNT OF FLAME RETARDANT (g) | AMOUNT OF PHOSPHORUS PRESENT (mol) |
|---|---|---|---|---|
| COMPARATIVE EXAMPLE CE1 | 20 | None | 0 | 0 |
| COMPARATIVE EXAMPLE CE2 | 20 | DEPP | 0.53 | 2.94E−3 |
| COMPARATIVE EXAMPLE CE3 | 20 | DEPP | 1.06 | 5.88E−3 |
| EX1 | 20 | FRRA1 | 0.6 | 2.94E−3 |
| EX2 | 20 | FRRA1 | 1.2 | 5.88E−3 |
| EX3 | 20 | FRRA2 | 0.62 | 2.94E−3 |
| EX4 | 20 | FRRA2 | 1.24 | 5.88E−3 |

TABLE 5-continued

| EXAMPLE | ADHESION ON STAINLESS STEEL, N/cm | ADHESION ON GLASS, N/cm | FAILURE MODE |
|---|---|---|---|
| EX1 | 2.2 | 2.7 | ADH |
| EX2 | 1.1 | 1.3 | ADH |
| EX3 | 4.2 | 5.8 | ADH |
| EX4 | 3.1 | 8.7 | ADH |

What is claimed is:

1. A method of forming a (meth)acrylate copolymer having a pendent phosphate-containing group, the method comprising:

providing a precursor (meth)acrylate copolymer having a monomeric unit comprising a pendent carboxylic acid group;

forming a reaction mixture comprising the precursor (meth)acrylate copolymer and an epoxy-functionalized phosphate compound; and reacting the epoxy-functionalized phosphate compound with the pendent carboxylic acid group of the precursor (meth)acrylate copolymer to form the (meth)acrylate copolymer having the pendent phosphate-containing group.

2. The method of claim 1, wherein the (meth)acrylate copolymer having the pendent phosphate-containing compound is a component of a pressure-sensitive adhesive.

3. The method of claim 1, wherein the epoxy-functionalized phosphate compound has a single epoxy group and one to three phosphate groups.

4. The method of claim 1, wherein the epoxy-functionalized phosphate compound is of Formula (I)

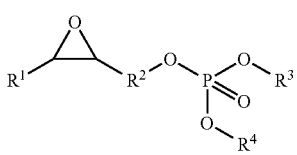

(I)

wherein
$R^1$ is hydrogen or methyl;
$R^2$ is a C1-C8 alkylene or a C3-C8 ether group;
$R^3$ is a C1-C4 alkyl, a benzyl, or combines with $R^4$ to form a cyclic group with 5 or 6 ring members that is optionally substituted with a C1-C3 alkyl; and
$R^4$ is a C1-C4 alkyl, benzyl, or combines with $R^3$ to form a cyclic group with 5 or 6 ring members that is optionally substituted with a C1-C3 alkyl.

5. The method of claim 4, wherein the epoxy-functionalized phosphate compound of Formula (I) is of Formula (I-C)

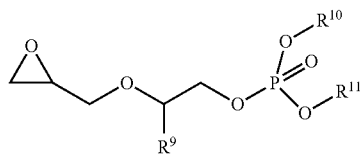

(I-C)

wherein
$R^9$ is hydrogen or a C1-C3 alkyl;
$R^{10}$ is a C1-C3 alkyl; and
$R^{11}$ in a C1-C3 alkyl.

6. The method of claim 1, wherein the epoxy-functionalized phosphate compound is of Formula (II)

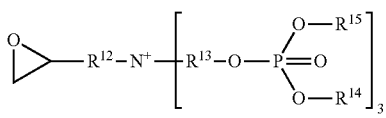

(II)

wherein
$R^{12}$ is an alkylene having 1 to 2 carbon atoms;
$R^{13}$ is an alkylene having 2 to 4 carbon atoms;
$R^{14}$ is a C1-C4 alkyl or combines with $R^{15}$ to form a cyclic group with 5 or 6 ring members that is optionally substituted with a C1-C3 alkyl; and
$R^{15}$ is a C1-C4 alkyl or combines with $R^{14}$ to form a cyclic group with 5 or 6 ring members that is optionally substituted with a C1-C3 alkyl.

7. The method of claim 1, wherein the precursor (meth) acrylate comprises 1 to 20 weight percent of the monomeric unit comprising a pendant carboxylic acid group based on a total weight of the precursor (meth)acrylate.

8. The method of claim 7, wherein the at least 50 percent of the monomeric unit comprising a pendant carboxylic acid group in the precursor (meth)acrylate are reacted with the epoxy-functionalized phosphate compound.

9. A pressure-sensitive adhesive comprising a (meth) acrylate copolymer having pendent phosphate-containing groups, wherein the (meth)acrylate copolymer having pendent phosphate-containing groups is a reaction product of a reaction mixture comprising:
a) a precursor (meth)acrylate copolymer having a monomeric unit comprising a pendent carboxylic acid group; and
b) an epoxy-functionalized phosphate compound, wherein an epoxy group of the epoxy-functionalized phosphate compound undergoes a ring opening reaction with the monomeric unit comprising a pendent carboxylic acid group.

10. An article comprising:
a permanent or temporary substrate; and
the pressure-sensitive adhesive composition of claim 9 positioned adjacent to the permanent or temporary substrate.

11. The article of claim 10, wherein the substrate is a polyimide film and wherein the article has a flammability rating of UL94 VTM-0.

* * * * *

UNITED STATES PATENT AND TRADEMARK OFFICE
CERTIFICATE OF CORRECTION

| | | |
|---|---|---|
| PATENT NO. | : 12,286,507 B2 | Page 1 of 1 |
| APPLICATION NO. | : 18/698249 | |
| DATED | : April 29, 2025 | |
| INVENTOR(S) | : Eumi Pyun | |

It is certified that error appears in the above-identified patent and that said Letters Patent is hereby corrected as shown below:

In the Claims

<u>Column 22</u>
Line 13, In Claim 5, delete "$R^{11}$ in a C1-C3 alkyl" and insert -- $R^{11}$ is a C1-C3 alkyl --, therefor.

Signed and Sealed this
Sixteenth Day of December, 2025

John A. Squires
*Director of the United States Patent and Trademark Office*